United States Patent [19]

Bulgrien

[11] Patent Number: 5,083,648
[45] Date of Patent: Jan. 28, 1992

[54] INCHING CLUTCH COMPENSATION FOR CENTRIFUGAL EFFECTS

[75] Inventor: Garth H. Bulgrien, Ephrata, Pa.

[73] Assignee: Ford New Holland, Inc., New Holland, Pa.

[21] Appl. No.: 645,172

[22] Filed: Jan. 24, 1991

[51] Int. Cl.⁵ ........................ B60K 41/22; F16D 25/14
[52] U.S. Cl. ............................. 192/3.58; 192/85 AA; 192/106 F; 74/335; 364/424.1
[58] Field of Search ............... 192/3.58, 85 R, 85 AA, 192/103 R, 103 F, 106 F; 74/331, 335, 360; 364/424.1

[56] References Cited

U.S. PATENT DOCUMENTS 3,217,851 11/1965 Mogk et al. .................. 192/106 F X
4,458,797 7/1984 Hawkins ...................... 192/103 F X
4,718,306 1/1988 Shigematsu et al. ........ 192/106 F X
4,858,495 8/1989 Horsch .............................. 74/360 X
4,989,470 2/1991 Bulgrien ............................. 74/335

Primary Examiner—Richard Lorence
Attorney, Agent, or Firm—Griffin Branigan & Butler

[57] ABSTRACT

In a microprocessor controlled power shift transmission system having hydraulically actuated clutches, compensation is provided to offset the effects of centrifugal force on the fluid in the clutch piston cavity, these effects causing a variation in the response of a clutch to a clutch actuation signal. A table of compensation values is provided for each clutch which may be inched. Engine or input speed and vehicle or output speed are sensed to derive an address for addressing the table of an active clutch. The compensation value read from a table is used to modify a modulation value and the modulation value is then used to generate an actuation signal which is applied to the active clutch. If the piston cavity of a clutch is mounted on a member which is in direct drive connection with the input or output shaft of the transmission then the table is addressed by an address derived from the input speed or the output speed, respectively. If there is a further clutch between the clutch and the input shaft or output shaft, the address for addressing the table is derived from the selected gear and the input speed or output speed depending on whether the cavity rotates with an input member or an output member of the clutch.

13 Claims, 5 Drawing Sheets

INCHING CLUTCH COMPENSATION FOR CENTRIFUGAL EFFECTS

CROSS REFERENCE TO RELATED APPLICATIONS

This application is related to my prior application Ser. No. 07/444,312 filed Dec. 1, 1989, (Application A) now abandoned, and my copending applications Ser. Nos. 07/621,159 filed Nov. 30, 1990 (Application B) and 07/645,171 filed concurrently herewith (Application C), the disclosures of which are incorporated herein by reference. This application and the foregoing applications are all assigned to Ford New Holland, Inc.

FIELD OF THE INVENTION

The present invention relates to a power shift transmission system having hydraulically actuated clutches. More particularly, the invention relates to a method of compensating for the variations in clutch response to an actuation signal, the variations resulting from centrifugal forces acting on hydraulic fluid in the clutch.

BACKGROUND OF THE INVENTION

Hydraulic clutches are subject to an oil pressure in a piston cavity due to centrifugal force on the oil or hydraulic fluid in the cavity when the cavity is rotating. In the case of an inching clutch with shiftable gear ratios between the clutch engine, the centrifugal pressure varies with both engine speed and gear selection if the piston cavity is on the input side of the clutch. If the piston cavity is on the output side of the clutch then the centrifugal pressure varies with the transmission output speed which is generally proportional to vehicle speed.

The centrifugal pressure variations cause variations in the vehicle response at different engine speeds, ground speeds and gear selection. For example, in a transmission as described in referenced Application A having 18 forward speeds and 9 reverse speeds the clutch pedal position at the inching point varies with changes in engine speed when 9th gear is selected, the inching point being higher with decreasing engine speed and lower with increasing engine speed. Also, the inching point is higher if the transmission is shifted to a gear lower than 9th gear, and when trying to obtain smooth shifts when rolling in gears above 9th gear, the inching point moves down as ground speed increases. These centrifugal pressure variations also result in a less than ideal response when attempting to limit inching capability, as described in referenced Applications B and C to improve clutch durability.

SUMMARY OF THE INVENTION

An object of the present invention is to provide a method of and apparatus for compensating for the effects of centrifugal pressure on the response of a hydraulic clutch to an actuation signal.

An object of the invention is to provide a method of and apparatus for hydraulic clutch control to obtain a more uniform response of the clutch to an actuation signal for different selected gears, engine speeds and ground speeds.

In accordance with the principles of the present invention a compensation is made for the effects of the pressure on a clutch piston resulting from centrifugal force exerted on the hydraulic fluid in the rotating cavity of the piston. In a power shift transmission for transmitting torque from an input shaft to an output shaft at any one of several gear speed ratios, the compensation is accomplished by establishing a table of compensation values for each clutch which may be controlled by a clutch pedal. Each time a modulation value for a clutch actuation signal is developed, the table corresponding to the active clutch is accessed to obtain a compensation value which is subtracted from the modulation value. The resulting value is then used to modulate the clutch actuation signal The table for a given clutch is accessed as a function of the engine speed, ground speed, gear selection and engine speed, or gear selection and ground speed, depending on whether the piston cavity is on the input or output side of the clutch, and whether or not there is a direct drive connection between the member which carries the piston cavity and the input shaft or output shaft of the transmission.

Other objects and advantages of the invention will become apparent upon consideration of the following description and the accompanying drawings.

DETAILED DESCRIPTION OF THE INVENTION

Figure 1:
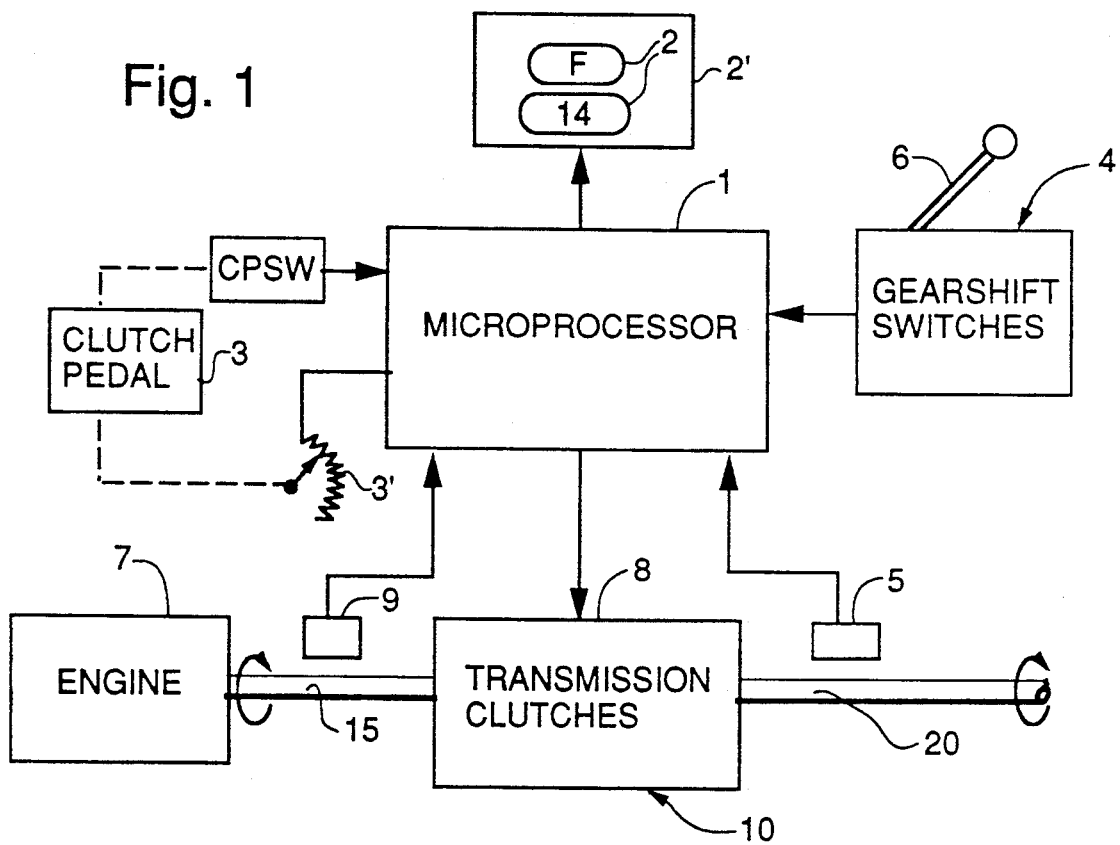
FIG. 1 is a schematic diagram of a power shift transmission system suitable for use in practicing the invention.

FIG. 1 illustrates a prior art power shift transmission system as shown in my aforementioned applications. The power shift transmission system includes a microprocessor 1, a display 2 on an operator's control panel 2', a plurality of gearshift switches 4 which are selectively actuated by manually moving a gearshift lever 6, and a plurality of transmission clutches 8 associated with a transmission 10 which transmits power from a rotating power input shaft 15 to a power output or vehicle drive shaft 20. An engine 7 unidirectionally rotates shaft 15 and a sensor 9 senses rotation of shaft 15 to provide output signals indicating the speed of engine 7. A sensor 5 senses rotation of shaft 20 to provide output signals representing vehicle speed. An operator-actuated clutch pedal 3 controls a potentiometer 3' and an analog output signal from the potentiometer is applied to microprocessor 1 to develop modulating signals which are applied to a selected clutch in a final set of clutches in transmission 10. The clutch pedal 3 also actuates a clutch pedal switch CPSW when the pedal is depressed to its limit of travel.

The gearshift switches 4 are Hall-effect switches or similar devices which are actuated by a magnet or magnets carried on the gearshift lever 6. Microprocessor 1 periodically samples the clutch pedal switch, the output of potentiometer 3', the switches 4, and the outputs of the speed sensors 5 and 9, and in response to the sensed conditions controls transmission clutches 8 to "select gears", i.e. select the direction and rate of rotation of output shaft 20 relative to input shaft 15.

Figure 3:
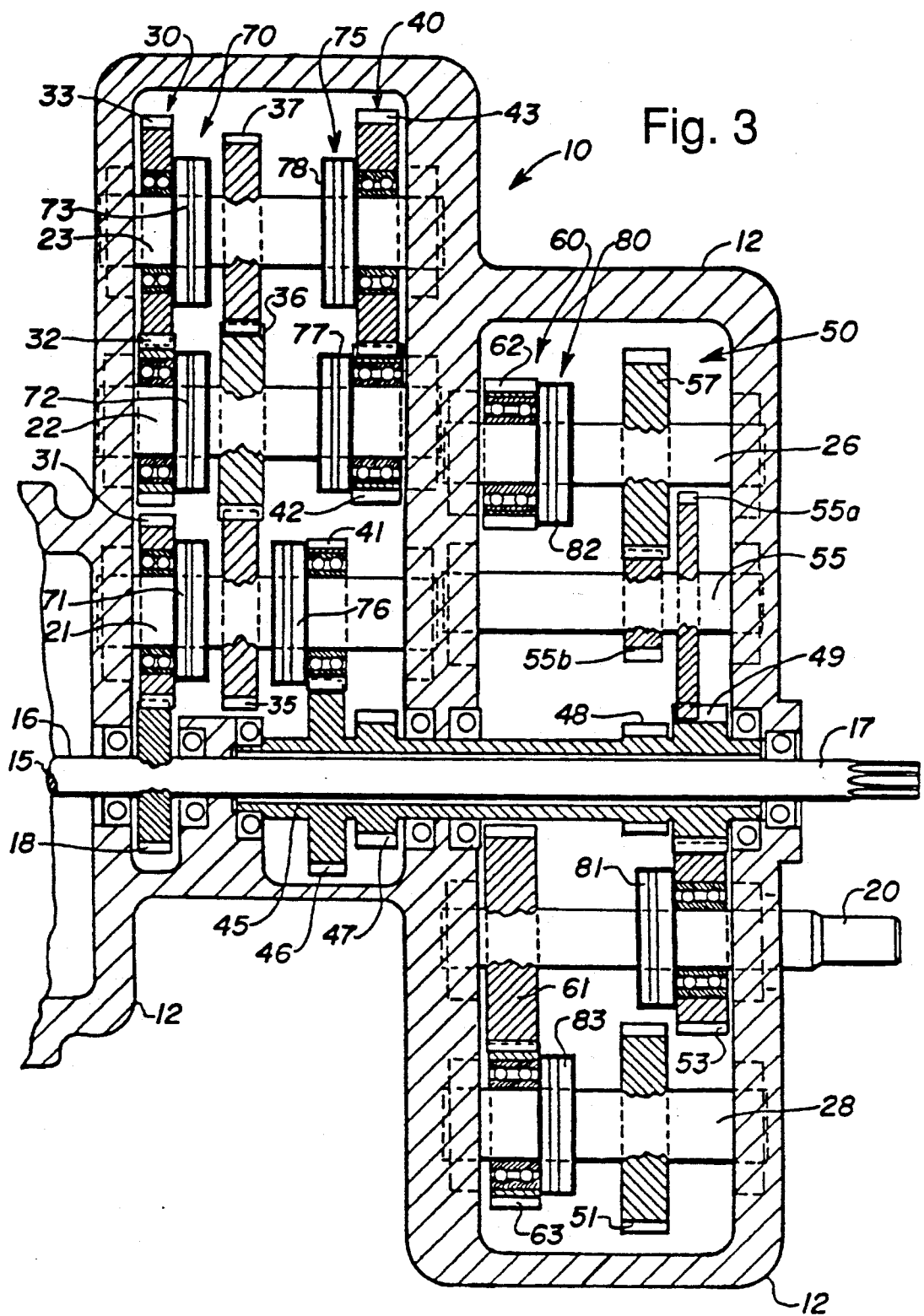
FIG. 3 is a schematic planar development of a three-dimensional transmission.

FIG. 3 is a schematic planar development of the three-dimensional transmission. Reference may be made to my above-referenced applications for a complete description of the transmission, the following brief description being provided only to illustrate a suitable apparatus for practicing the present invention.

As shown in FIG. 3, the transmission 10 includes an exterior casing 12 forming a framework for supporting the power input shaft 15 rotatably journalled on the casing 12 at a central location extending entirely through the transmission 10 from an engine end 16, which receives rotational power directly from the engine 7, to a drive end 17 at the opposing end of the transmission 10, which can be used as a power takeoff shaft. The transmission includes a first jack shaft 21, a second jack shaft 22, a third jack shaft 23, a fourth jack shaft 26, a fifth jack shaft 28, the shaft 55 of a double transfer gear and the output shaft 20. Each of shafts 20, 21, 22, 23, 26, 28 and 55 is journalled by bearings rotatably supporting the respective shafts for rotation within the casing 12.

The power input shaft 15 is provided with a drive pinion 18 splined thereto for rotation therewith at the engine end 16 of the power input shaft 15. The drive pinion 18 is drivingly engaged with a primary drive gear set 30. More specifically, the drive pinion 18 is directly engaged with a first drive gear 31 rotatably mounted on the first jack shaft 21 for rotation independently of the first shaft 21. The drive pinion 18 is also directly engaged with a third drive gear 33 rotatably mounted on the third jack shaft 23 for rotation relative thereto. The third drive gear 33 is meshed in engagement with a second drive gear 32, which in turn is rotatably mounted on the second jack shaft 22. Each of the drive gears 31, 32 and 33 is journalled by bearings mounted on their respective jack shafts and driven by the power input shaft 15 by virtue of direct or indirect engagement with the drive pinion 18. Each of the drive gears 31, 32 and 33 is sized differently to provide different speeds of rotation thereof when rotated by the drive pinion 18.

Each of the jack shafts 21, 22 and 23 is provided with a corresponding fixed gear 35, 36 and 37, respectively. The second fixed gear 36 is drivingly engaged with both the first fixed gear 35 and the third fixed gear 37 so that the rotation of any one of the jack shafts 21, 22 and 23 will effect a simultaneous rotation of all the other jack shafts 21, 22 and 23. Since all the fixed gears 35, 36 and 37 are identical in size, the first jack shaft 21, the second jack shaft 22 and the third shaft 23 will rotate at identical speeds.

The transmission 10 is also provided with an intermediate gear set 40 corresponding to the primary drive gear set 30 and including a first intermediate gear 41 mounted on the first jack shaft 21 for rotation relative thereto, a second intermediate gear 42 rotatably mounted on the second jack shaft 22, and a third intermediate gear 43 rotatably supported on the third jack shaft 23. The intermediate gears 41, 42 and 43 are differently sized to effect a different speed ratio particularly when combined with the differently sized drive gears 31, 32 and 33 of the primary drive gear set 30, as will be described in greater detail below. The first and third intermediate gears 41, 43 are engaged with a transfer hub assembly 45 as will be described below, while the second intermediate gear 42 is drivingly engaged with the third intermediate gear 43. Like the primary drive gear set 30, each intermediate gear 41, 42 and 43 is journalled by bearings mounted on the corresponding jack shaft 21, 22 and 23 to permit independent rotation therebetween.

The intermediate gear set 40 is engaged with a transfer hub assembly 45 rotatably supported from the casing 12 concentric with the power input shaft 15. The transfer hub assembly 45 includes a first transfer gear 46 drivingly engaged with the first intermediate gear 41 and a second transfer gear 47 drivingly engaged with the third intermediate gear 43. The transfer hub assembly 45 is also provided with a co-joined third transfer gear 48 and fourth transfer gear 49 to transfer rotational power from the intermediate gear set 40 to a transfer gear set 50.

The third transfer gear 48 is drivingly engaged with a reverse transfer gear 51 fixed to the fifth jack shaft 28. Likewise, a high-speed transfer gear 53 is rotatably journalled on the power output shaft 20. A double transfer gear 55 having a shaft-like configuration and integral gear members 55a and 55b is rotatably supported in the casing 12. The gear member 55a is also drivingly engaged with the fourth transfer gear 49, while the gear member 55b is engaged with a low-speed transfer gear 57 fixedly secured for rotation with the fourth jack shaft 26.

A final drive gear set 60 includes a high-speed final gear 61 rigidly secured to the power output shaft 20 for rotation therewith, a low-speed final gear 62 rotatably journalled by bearings on the fourth jack shaft 26 for rotation independently relative thereto, and a reverse final gear 63 rotatably journalled on the fifth jack shaft 28 for rotation relative thereto. The final drive gear set 60 is interengaged for simultaneous rotation such that the high-speed final gear 61 fixed to the power output shaft 20 is operatively intermeshed with both the low-speed final gear 62 and the reverse final gear 63.

The transmission includes three clutch sets 70, 75 and 80 operable to effect rotation of the various gears rotatably mounted on jack shafts. The initial clutch set 70 includes a first clutch 71 mounted on the first jack shaft 21, a second clutch 72 mounted on the second jack shaft 22 and a third clutch 73 mounted on the third jack shaft 23. Each clutch 71, 72 73 of the initial clutch set 70 is operable to engage the corresponding drive gear 31, 32 and 33 to effect rotation of the corresponding jack shaft 21, 22 and 23 with the corresponding drive gear 31, 32 and 33 at the speed the drive gear is rotating. Likewise, an intermediate clutch set 75 includes first, second and third intermediate clutches 76, 77 and 78, respectively, mounted on the first, second, and third jack shafts 21, 22 and 23, respectively, for engagement with the corresponding intermediate gear 41, 42 and 43 at the speed at which the corresponding jack shaft is being driven.

A final clutch set 80 includes a high-speed final clutch 81 mounted on the power output shaft 20 and engageable to couple the high-speed transfer gear 53 to the high-speed final gear 61 when so engaged. The final clutch set 80 also includes a low-speed final clutch 82 mounted on the fourth jack shaft 26 to effect a coupling, when engaged, between the low-speed transfer gear 57 and the low-speed final gear 62. Likewise, the final clutch set 80 also includes a reverse final clutch 83 mounted on the fifth jack shaft 28 for selectively coupling the reverse transfer gear 51 to the reverse final gear 63. To attain any given speed of rotation of the power output shaft 20 for a given speed of rotation of the power input shaft, only one selected clutch of each clutch set 70, 75, 80 is engaged at a time. The engagement of two clutches of any one clutch set 70, 75 and 80 has the effect of locking the transmission 10.

With all of the components of the transmission 10 situated as described above, transmission 10 can transmit a given engine speed received by the engine end 16 of the power input shaft 15 to the output shaft 20 in twenty-seven different speed variations with eighteen forward speeds and nine reverse speeds. It can be seen that the drive pinion 18 constantly delivers rotational power from the engine to the primary gear set 30 such that the first, second, and third drive gears 31, 32 and 33 are constantly driven with the drive pinion 18 relative to the respective jack shaft 21, 22 and 23 on which the gears of the primary drive gear set 30 are respectively mounted. The engagement of one of the clutches 71, 72 and 73 of the initial clutch set 70 effects an engagement of the corresponding drive gear 31, 32 or 33 with the respective jack shaft 21, 22 or 23 and effects rotation of the jack shafts 21, 22 and 23 at the speed at which the corresponding drive gear is being rotated. Since the intermeshed fixed gears 35, 36 and 37 are of identical size, rotation of any one of the jack shafts 21, 22 and 23 will effect rotation of all three jack shafts 21, 22 and 23 at identically the same speed as the drive gear 31, 32 and 33 engaged by the selected clutch of the initial clutch set 70.

The engagement of one of the clutches of the initial clutch set 70 will effect a corresponding rotation of the first, second, and third jack shafts 21, 22 and 23 at a selected speed corresponding to the corresponding drive gear from the primary drive gear set 30. A subsequent engagement of one of the clutches 76, 77 and 78 of the intermediate clutch set 75 effects an engagement between the corresponding intermediate gear from the intermediate gear set 40 with the rotating jack shaft corresponding to the selected intermediate clutch at the speed at which the jack shafts 21, 22 and 23 are rotating. Since all of the intermediate gears of the intermediate gear set 40 are engaged with the transfer hub assembly 45, directly or indirectly, which in turn is engaged with the transfer gear set 50, an engagement of one of the clutches of the intermediate clutch set 75 effects a rotation of all gears of the intermediate gear set 40, the transfer hub assembly 45, all of the transfer gears 46, 47, 48 and 49 and all of the gears in the transfer gear set 50, as well as the corresponding rotation of both the fourth and fifth jack shafts 26, 28 due to a fixed engagement with the corresponding transfer gears 51, 57.

Finally, an engagement of one of the clutches 81, 82 and 83 of the final clutch set 80 will transfer rotational power from the corresponding transfer gear to the corresponding final gear 61, 62 and 63 of the final drive gear set 60 to cause a rotation of the power output shaft 20 at the speed ratio corresponding to the combination of the respective gears engaged by the activated clutches of the initial clutch set 70, the intermediate clutch set 75 and the final clutch set 80.

The torque transmitting elements of the clutches in transmission 10 are hydraulically actuated to transfer torque. Solenoid operated valves (not shown) control the pressure applied to clutch plates and thus the torque transferred to the output shaft 20 to move the vehicle.

The clutches 81, 82 and 83 in the final clutch set 80 serve as inching clutches. As explained in my aforementioned Application A, clutches in the transmission may be calibrated after a tractor has been assembled or when the tractor is serviced. During calibration, the microprocessor stores a digital value $I_S$ where $I_{MAX} > I_S > I_{MIN}$. The digital value $I_S$ represents the magnitude of a pulse width modulated current signal which, when applied to a solenoid of a solenoid operated valve, allows hydraulic fluid controlled by the valve to apply to the clutch plates a pressure just less than that required to transmit torque through the clutch. A separate value $I_S$ is stored for each clutch.

$I_{MAX}$ represents the maximum current signal which may be applied to a clutch solenoid. The hydraulic pressure applied to a clutch varies inversely with respect to the current applied to the solenoid of the clutch. Thus, when a current $I = I_{MAX}$ is applied to a clutch solenoid, the lowest hydraulic pressure is applied to the clutch plates and when a current $I = I_{MIN}$ is applied to the solenoid the maximum hydraulic pressure is applied to the clutch plates.

Figure 2:
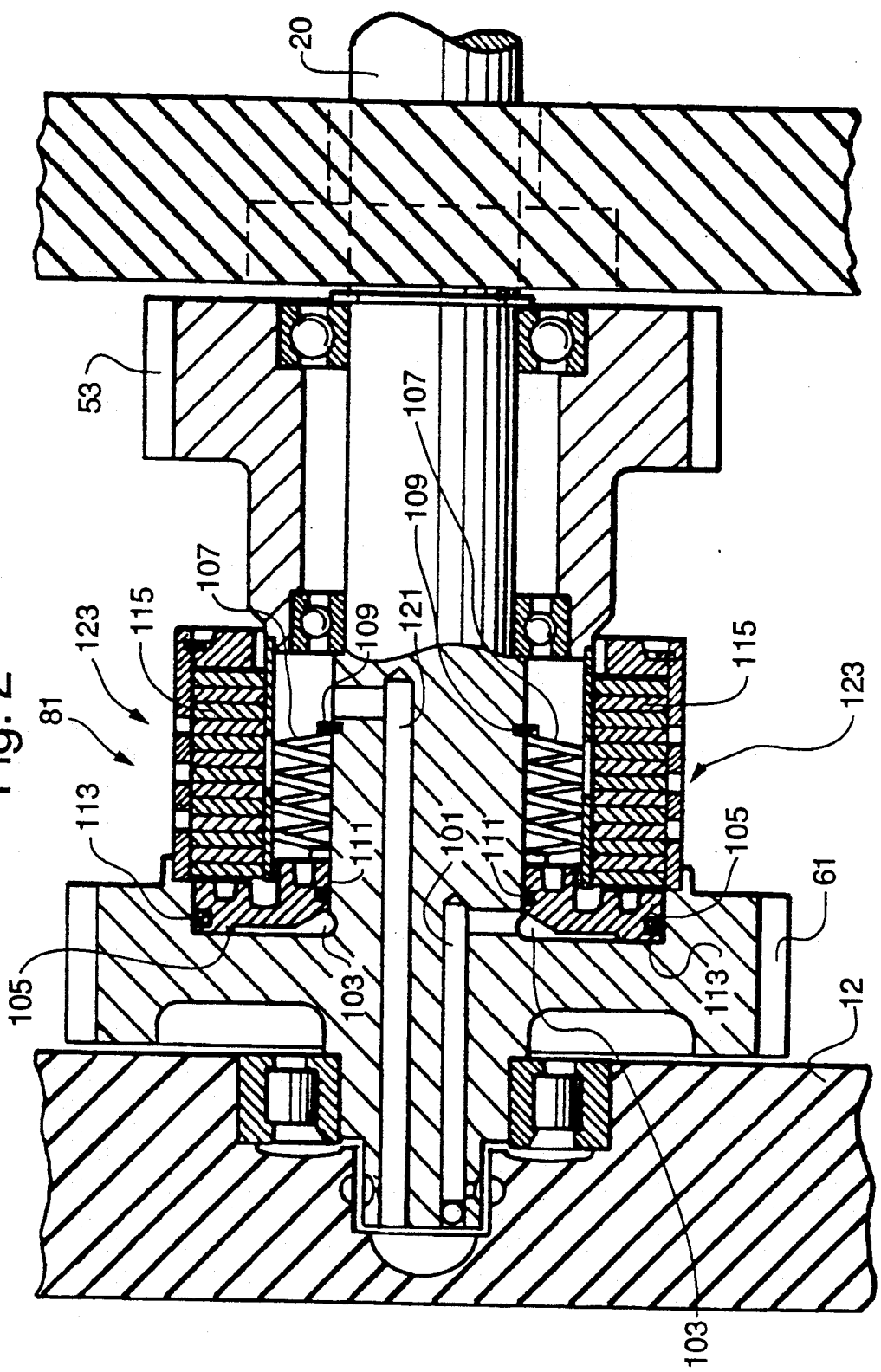
FIG. 2 is a sectional view of a typical hydraulic clutch.

FIG. 2 illustrates a typical hydraulic clutch construction. The particular clutch shown is the high-speed final clutch 81 but it is typical of the clutches shown in FIG. 3. As shown in FIG. 2, clutch 81 is mounted on output shaft 20 so as to rotate therewith. A hydraulic fluid passage 101 extends through the shaft 20 to a piston cavity 103 which contains a piston 105. When a clutch actuation signal is applied to a solenoid (not shown) hydraulic fluid at a control pressure is injected through passage 101 into cavity 103. The piston 105 surrounds shaft 20 and a first ring seal 111 prevents leakage of hydraulic fluid between the piston and shaft 20 while a second ring seal 113 prevents leakage of hydraulic fluid between piston 105 and gear 61.

Piston 105 is forced to the right as the pressure exerted on it by the hydraulic fluid increases. As the piston moves to the right it compresses a spring 107 which surrounds shaft 20. A ring stop 109 prevents rightward movement of the spring.

As piston 105 moves to the right it also acts against a clutch pack 115. The clutch pack includes two sets of clutch plates which surround shaft 20 outwardly of spring 107. The plates of the sets alternate in clutch pack 115 in a conventional manner with the second set being mounted so as to rotate with gear 53 and the first set being mounted so as to rotate with shaft 20.

As the piston 105 is forced to the right, the plates of the first set are forced into frictional engagement with the plates of the second set, the force or clutch pressure being dependent on the hydraulic pressure in cavity 103. The gear 53 is the input drive member for the clutch as explained with reference to FIG. 3. Thus, as the piston exerts force on the clutch pack torque is transmitted from gear 53 through the plates in clutch pack 115 to the output shaft 20. When the hydraulic pressure in cavity 103 is released, the compressed return spring 107 acts against piston 105 to move it back to the position shown in FIG. 2 so that transmission of torque through the clutch ceases.

The passage 121 receives a constant supply of lubricating oil which is forced through clutch pack 115 and exits through passages 123 into the transmission casing.

When the shaft 20 and clutch 81 rotate, the hydraulic fluid in cavity 103 is subjected to a centrifugal force and as a result exerts a pressure on piston 105 so that the clutch pack is subjected to a pressure which is the sum of the control pressure delivered via passage 101 and the pressure resulting from the centrifugal force. The pressure on the clutch pack resulting from the centrifugal force on the hydraulic fluid in cavity 103 is a function of the rate of rotation of the cavity.

The present invention provides a method for compensating for the effect of the centrifugal pressure on clutch response to a clutch actuation signal. The method requires that the rate of rotation of the cavity 103 be determined.

For the particular clutch 81 shown in FIG. 2, the cavity 103 is on the output side of the clutch. That is, it rotates with the driven member which is shaft 20, gear 53 being the driving member. Therefore, the rate of rotation of the cavity may be determined by sensing ground speed, that is, the rate of rotation of the output shaft 20 which is directly related to ground speed.

On the other hand, if the cavity 103 were on the input side of a clutch then the rate of rotation of the cavity may be determined from the rate of rotation of the input shaft 15 (or engine 7) and the selected gear. This is the case for clutches 82 and 83. For clutch 82, the drive member is shaft 26 on which the clutch is mounted and the driven member is gear 62. For clutch 83, the drive member is shaft 28 on which the clutch is mounted and gear 61 is the driven member.

To provide compensation for the effects of the centrifugal force described above, a table of compensation values is provided for each of the clutches 81, 82 and 83. These tables of compensation values are stored in a non-volatile memory associated with the microprocessor and each time the microprocessor develops a modulation value for generating a clutch actuation signal, it accesses the table for that clutch to obtain a compensation value which is subtracted from the modulation value before the clutch actuation signal is generated.

Figure 4A:
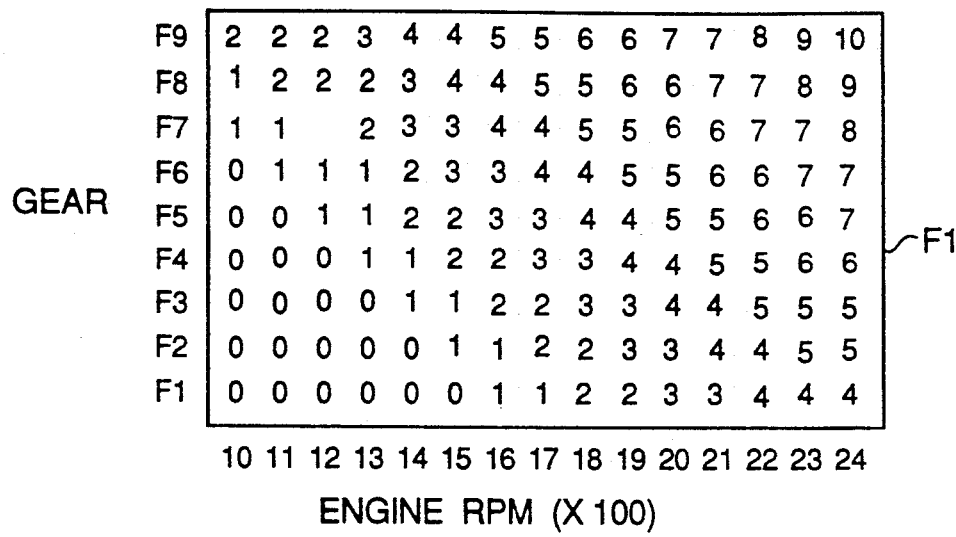
FIGS. 4A-4E illustrate compensation tables and the different combinations of parameters which may be used to select values from them; and, FIG. 5 is a flow diagram of a microprocessor program which may be utilized to practice the invention.
Figure 4B:
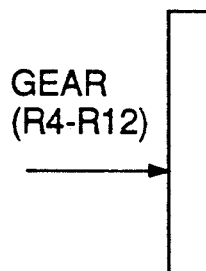
Figure 4C:
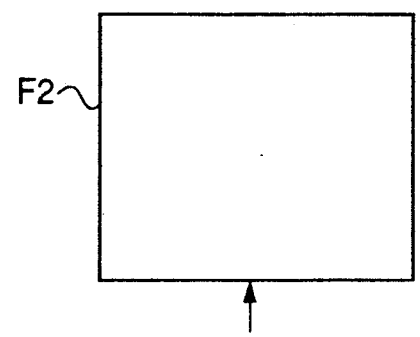

The tables F1, R and F2 for clutches 82, 83 and 81, respectively, are illustrated in FIGS. 4A, 4B and 4C, respectively. With reference to FIG. 4A, it is seen that for a given engine speed, the compensation value for the low speed final clutch 82 increases as the selected gear increases, and for a given selected gear the compensation value increases as the engine speed increases. The values shown in the table are exemplary only, and will vary according to the size of the clutch cavity 103 and its distance from its axis of rotation. The values in the table F1 are accessed by an address which is derived from the selected forward gear and the engine speed, because the cavity 103 of clutch 82 rotates with the shaft 26 which is the drive member for the clutch.

The table R for the reverse clutch 83, shown in FIG. 4B, is like the table of FIG. 4A except that it is accessed by an address derived from the selected reverse gear and the engine speed. The selected gear and engine speed are used because the cavity 103 of clutch 83 rotates with shaft 28 which is the drive member for the clutch.

The table for the high speed final clutch 81, illustrated in FIG. 4C, is accessed by an address derived from the rate of rotation of the output shaft 20 since the cavity of this clutch rotates with the output shaft.

Figure 5:
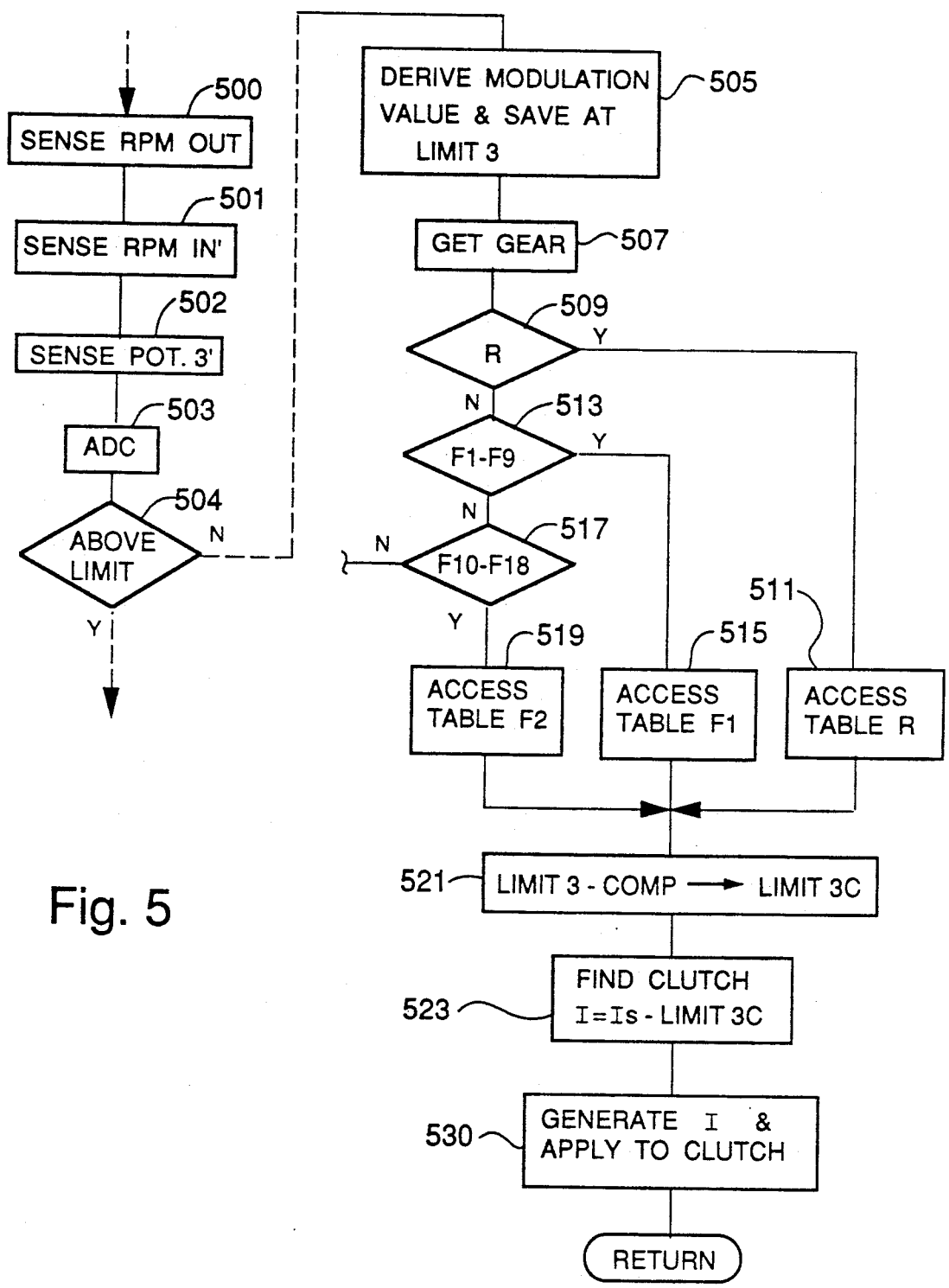

The method of compensation according to the present invention may be implemented in different ways. For example, the microprocessor 1 may be programmed to execute a routine as illustrated in FIG. 5. As explained in copending Application C the microprocessor executes a routine similar to that shown in FIG. 5 to develop a modulation value for modulating a clutch actuation signal when the clutch pedal 3 is depressed.

The microprocessor 1 periodically interrupts (at intervals of say 5 milliseconds) any routine it is executing and performs a routine during which it sequentially samples the outputs from the gearshift switches 4, sensors 5 and 9, potentiometer 3' and switch CPSW. As shown in FIG. 5, the output shaft or ground speed sensor 5 is sampled at step 500 and the input shaft or engine speed sensor 9 is sampled at step 501. The sensors 5 and 9 may be magnetic or other type devices which sense teeth on gears mounted on shafts 15 and 20. The microprocessor is programmed to convert the pulses from sensors 5 and 9 into digital values representing the RPM of shafts 15 and 20. At step 502 the analog output of potentiometer 3' is sensed and at step 503 the microprocessor converts the analog signal to an 8-bit digital value representing the position of clutch pedal 3. At step 504 this digital value is tested to determine if the clutch pedal has been depressed.

If the test at step 504 indicates that the clutch pedal is depressed, the program moves to step 505, the details of which are disclosed in Application C. At step 505 the microprocessor 1 derives a modulation value for modulation the actuation signal for the active clutch 81, 82 or 83 and saves this value at a location LIMIT 3.

At step 507, the microprocessor 1 accesses a register or memory location PG (Present Gear) which always stores an indication of the active gear. At step 509 PG is tested to see if the active gear is a reverse gear. If it is, the program executes step 511 to read from Table R a compensation value. The address for accessing Table R is derived by combining the stored value representing the rate of rotation of input shaft 15 with the value of the selected gear as found at step 507. At step 521, the compensation value read from Table R is then subtracted from the modulation value saved at LIMIT 3 and the result saved at a location LIMIT 3C.

Returning for the moment to step 509, if the test should indicate that the active gear is not a reverse gear then step 513 is executed to determine if the active gear is one of the low speed forward gears. If it is, step 515 is executed to read a compensation value from Table F1 and at step 521 the compensation value is subtracted from the modulation value and the result is saved at LIMIT 3C. Like Table R, Table F1 is accessed by an address derived from the active gear and the stored value representing the rate of rotation of input shaft 15.

If the test at step 513 shows that the active gear is not one of the lower forward gears, a test is made at step 517 to determine if the active gear is one of the higher forward gears. If it is not, then the transmission must be in neutral. No clutch actuation signal is required so the program exits the routine. However, if the test at step 517 proves true, then Table F2 is accessed at step 519 to read a compensation value from the table. At step 521 this compensation value is subtracted from the modulation value saved at LIMIT 3 during execution of step 505. Table F2 is accessed using only the stored value representing the rate of rotation of the output shaft 20.

At the end of step 521, location LIMIT 3C contains a value for modulating the clutch actuation signal, this value representing the modulation value derived at step 505 but compensated for the effect of centrifugal force on the clutch response. The compensated modulation value in LIMIT 3C may now be used to modulate the clutch actuation signal.

Since there is a different stored clutch calibration value $I_S$ for each of the clutches 81, 82 and 83, step 523 first determines which of these clutches is active, fetches from memory the value $I_S$ for the active clutch and subtracts from $I_S$ the value in LIMIT 3C. The resulting digital value I is then used at step 530 to generate the pulse width modulated clutch actuation signal I which is applied to the active clutch.

After step 530 is executed, the program returns to the step which follows step 504. It will be understood that the microprocessor continues to output the signal I even after the program leaves step 530, this being accomplished by circuits within the microprocessor as is well known in the art. At the next interrupt steps 500-504 are repeated and if the test at step 504 indicates that the pedal is still depressed, the remainder of the steps shown in FIG. 5 are repeated. This continues as long as the clutch pedal position is below a limit position as described more fully in Application A.

With regard to steps 521 and 523 it will be noted that by subtracting the compensation value from the modulation value, the compensated modulation value (LIMIT 3C) is less than the uncompensated modulation value (LIMIT 3) by an amount equal to the compensation. Thus, when LIMIT 3C is subtracted from $I_S$ at step 523 it results in a clutch actuation signal I which is larger (by the amount of the compensation) than if LIMIT 3 were subtracted from $I_S$. Since clutch pressure is inversely proportional to the magnitude of the actuation signal I, the clutch pressure is reduced by an amount equal to the compensation value.

While the invention has been described in conjunction with clutch pedal control for inching a clutch, it may be utilized to obtain more consistent clutch response in any situation wherein a clutch actuation signal is modulated.

Figure 4D:
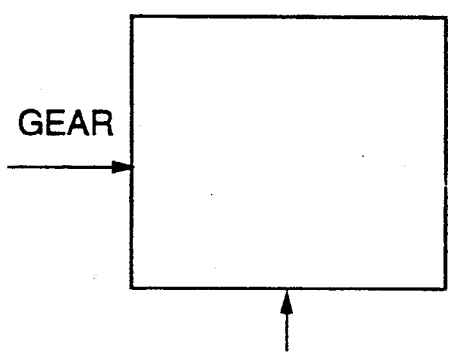
Figure 4E:
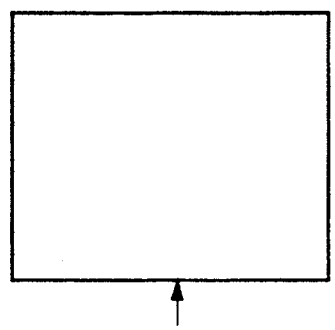

Furthermore, the invention is not limited in its use to the specific transmission and clutch arrangement illustrated in FIG. 3. It is within the scope of the invention to provide compensation for centrifugal force with the compensation table being accessed by an address derived only from the rate of rotation of input shaft 15, as shown in FIG. 4E or an address derived from a combination of the output speed and the selected gear. The parameter or parameters used to address the compensation table are determined by the transmission and clutch arrangement. If the clutch piston cavity is on the input side of the clutch, and this input side is directly driven from the input shaft 15, that is, there are no intervening clutches, the rate of rotation of the input shaft alone may be used to access the compensation table. If there is an intervening clutch then the active gear must also be used in accessing the table.

A similar situation exists for clutches where the piston cavity 103 is carried by the driven member. If there is a direct drive connection (no intervening clutch) between the driven member and the output shaft, the rate of rotation of the output shaft may be used alone to access the compensation table but if there is an intervening clutch then the active gear and the speed of the output shaft must be used in combination to access the compensation table as illustrated by FIG. 4D.

It will be understood that the method of clutch control described above may be practiced with other apparatus, and variations may be made in the disclosed method without departing from the spirit and scope of the invention as defined by the appended claims.

I claim:

1. In a transmission having at least one clutch for selectively transferring torque from an input shaft to an output shaft, the clutch including a piston in a rotating piston cavity for applying pressure to clutch plates, the piston being responsive to the pressure of hydraulic fluid injected into the cavity on one side of the piston at a pressure determined by a clutch actuation signal, a method of compensating for the pressure applied to the clutch plates as a result of centrifugal force exerted on hydraulic fluid in the cavity, said method comprising the steps of:

determining the rate of rotation of the piston cavity; and, modifying the clutch actuation signal with a value determined by the rate of rotation of the cavity, so that the amount of torque transmitted by said clutch through said clutch plates is unaffected by the rate of rotation of the piston cavity, thereby permitting consistent control of the transmission of torque through said clutch irrespective of the rate of rotation of the piston cavity.

2. A method as claimed in claim 1 wherein the step of determining the rate of rotation of the piston cavity comprises sensing one of the parameters in the group of parameters consisting of the rate of rotation of the input shaft and the rate of rotation of the output shaft.

3. A method as claimed in claim 2 wherein the parameter sensed is the rate of rotation of the input shaft.

4. A method as claimed in claim 2 wherein the parameter sensed is the rate of rotation of the output shaft.

5. In a transmission having a plurality of clutches for transferring torque from an input shaft to an output shaft at a selected one of a plurality of gear speed ratios, at least one of said clutches being a hydraulic clutch including a piston in a rotating piston cavity for applying pressure to clutch plates, the piston being responsive to the pressure of hydraulic fluid injected into the cavity on one side of said piston at a pressure determined by a clutch actuation signal, a method of compensating for the pressure applied to the clutch plates as a result of centrifugal force exerted on hydraulic fluid in the cavity, said method comprising the steps of:

for said at least one hydraulic clutch, providing a corresponding table of compensation values which, when used to modify the actuation signal applied to the corresponding clutch, causes a reduction in the pressure applied to the corresponding clutch by an amount substantially equal to a pressure applied to the clutch plates as a result of centrifugal force exerted on hydraulic fluid in the piston cavity of the corresponding clutch on one side of said piston;

determining the rate of rotation of the piston cavity of an active hydraulic clutch to which a clutch actuation signal is to be applied;

selecting a compensation value from the table corresponding to the active clutch in accordance with the determined rate of rotation of the piston cavity of the active clutch; and, modifying the actuation signal applied to the active clutch in accordance with the compensation value read from the table so that the torque transmitted through said one of said hydraulic clutches is unaffected by the centrifugal pressures exerted on the hydraulic fluid during rotation thereof, thereby permitting consistent control of the transmission of torque through said clutch irrespective of the rate of rotation of the piston cavity.

6. A method as claimed in claim 5 wherein the step of determining the rate of rotation comprises determining at least one parameter of the group of parameters comprising the rate of rotation of the input shaft, the rate of rotation of the output shaft and the selected gear speed ratio.

7. A method as claimed in claim 6 wherein the parameters determined are the rate of rotation of the input shaft and the selected gear speed ratio.

8. A method as claimed in claim 6 wherein the parameter determined is the rate of rotation of the output shaft.

9. A method as claimed in claim 6 wherein the parameters determined are the rate of rotation of the output shaft and the selected gear speed ratio 10. A method as claimed in claim 6 wherein the parameter determined is the rate of rotation of the input shaft.

11. A method as claimed in claim 6 wherein said transmission is provided with a plurality of hydraulic clutches, each said hydraulic clutch having a corresponding table of compensation values for utilization when activated, said method further comprising the step of:

choosing one of said plurality of hydraulic clutches; and said selecting step utilizing the table of compensation values corresponding to the chosen hydraulic clutch.

12. In a transmission system, the combination comprising:

a transmission having a plurality of hydraulic clutches for selectively transferring torque from a rotatable drive member to a rotatable driven member, at least two of said clutches being inching clutches;

gear selection means for selectively engaging said plurality of clutches so that an output shaft of the transmission may be driven at a selected gear speed ratio relative to an input shaft;

an operator-controlled clutch pedal;

control means responsive to said clutch pedal for deriving a modulation signal for modulating a clutch actuation signal;

said inching clutches each having a clutch piston positioned within a cavity which rotates with one of said members, said cavities containing hydraulic fluid on one side of said piston which is subjected to centrifugal force as the cavity rotates, thereby applying a force to said pistons;

said control means including means for storing compensation values for compensating for the effects of said centrifugal pressures on said pistons; and sensor means for sensing the rate of rotation of said input shaft, said control means including means responsive to said sensing means and said gear selection means for modifying the clutch actuation signal applied to one of said inching clutches with one of said stored values so that the torque transmitted through said one of said inching clutches is unaffected by the centrifugal pressures exerted on the hydraulic fluid during rotation thereof, thereby permitting the operator to have consistent control of the transmission of torque through said clutch irrespective of the rate of rotation of said input shaft.

13. The combination as claimed in claim 12 and further comprising second sensor means for sensing the rate of rotation of said output shaft, said control means including means responsive to said second sensor means for modifying the clutch actuation signal applied to a second of said inching clutches with one of said stored values.

* * * * *